(12) United States Patent
Nonoyama et al.

(10) Patent No.: US 11,443,904 B2
(45) Date of Patent: Sep. 13, 2022

(54) STEERING WHEEL

(71) Applicants: TOYODA GOSEI CO., LTD., Kiyosu (JP); MATSUO INDUSTRIES, INC., Nagoya (JP)

(72) Inventors: Yuki Nonoyama, Kiyosu (JP); Osamu Hirose, Kiyosu (JP); Ryosuke Jinnai, Kiyosu (JP); Chihiro Kanetake, Kiyosu (JP); Kazuomi Takeuchi, Aichi Pref. (JP)

(73) Assignees: TOYODA GOSEI CO., LTD., Aichi-pref. (JP); MATSUO INDUSTRIES, INC., Nagoya (JP)

( * ) Notice: Subject to any disclaimer, the term of this patent is extended or adjusted under 35 U.S.C. 154(b) by 558 days.

(21) Appl. No.: 16/523,097

(22) Filed: Jul. 26, 2019

(65) Prior Publication Data

US 2020/0043679 A1 Feb. 6, 2020

(30) Foreign Application Priority Data

Aug. 1, 2018 (JP) .............................. JP2018-144839

(51) Int. Cl.
*H01H 13/14* (2006.01)
*B60Q 5/00* (2006.01)
(Continued)

(52) U.S. Cl.
CPC .............. *H01H 13/14* (2013.01); *B60Q 5/003* (2013.01); *B60R 21/2037* (2013.01); *B62D 1/04* (2013.01);
(Continued)

(58) Field of Classification Search
CPC ........ H01H 13/00; H01H 13/04; H01H 13/10; H01H 13/14; H01H 2207/026;
(Continued)

(56) References Cited

U.S. PATENT DOCUMENTS

| 2010/0219621 A1 | 9/2010 | Sasaki et al. |
| 2012/0169032 A1 | 7/2012 | Sasaki et al. |

(Continued)

FOREIGN PATENT DOCUMENTS

| CN | 103085754 A | 5/2013 | |
| JP | 2010-201949 A | 9/2010 | |
| JP | 4538956 B2 * | 9/2010 | ............. B60Q 5/003 |

OTHER PUBLICATIONS

Office Action dated Jul. 19, 2021 issued in the corresponding Chinese patent application No. 201910707911.0 (and partial English translation).

*Primary Examiner* — James A English
*Assistant Examiner* — Daniel M. Keck
(74) *Attorney, Agent, or Firm* — Posz Law Group, PLC

(57) ABSTRACT

A steering wheel, in which an airbag device is attached to a core metal, including a through hole for attachment of the airbag device, via a horn switch mechanism, the horn switch mechanism including: a metal pin member whose tip end portion is locked to the core metal via an engagement member to be engaged with the tip end portion in a state where the tip end portion is inserted into the through hole and which forms a part of an electrical circuit configured to operate the horn device; and a resin cap which is interposed between an inner surface of the through hole and an outer surface of the pin member, the steering wheel includes a plurality of connection paths configured to normally connect the pin member and the core metal in a manner of forming a part of the electrical circuit.

6 Claims, 12 Drawing Sheets

(51) Int. Cl.
    *B60R 21/203*     (2006.01)
    *B62D 1/04*     (2006.01)
    *H01H 13/04*     (2006.01)
    *H01H 13/10*     (2006.01)
    *B62D 7/22*     (2006.01)

(52) U.S. Cl.
    CPC ............ *H01H 13/04* (2013.01); *H01H 13/10* (2013.01); *H01H 2207/026* (2013.01)

(58) Field of Classification Search
    CPC . B60Q 5/003; B60R 21/2037; B60R 21/2035; B62D 1/04; B62D 7/222
    See application file for complete search history.

(56) References Cited

U.S. PATENT DOCUMENTS

| | | | |
|---|---|---|---|
| 2017/0144594 A1* | 5/2017 | Obayashi | B62D 1/04 |
| 2017/0361801 A1* | 12/2017 | Banno | B60R 21/2037 |
| 2019/0161004 A1* | 5/2019 | Park | H01H 13/14 |
| 2019/0344744 A1* | 11/2019 | Spencer | H01H 13/04 |
| 2020/0189657 A1* | 6/2020 | Gothekar | B60R 21/2037 |

\* cited by examiner

STEERING WHEEL

CROSS-REFERENCE TO RELATED APPLICATION(S)

This application is based upon and claims the benefit of priority from Japanese Patent Application No. 2018-144839, filed on Aug. 1, 2018, the entire contents of which are incorporated herein by reference.

BACKGROUND

1. Field of the Invention

The present invention relates to a steering wheel to which an airbag device is attached.

2. Description of the Related Art

It is widely used to attach an airbag device to a steering wheel (with reference to JP-A-2010-201949).

The airbag device described in JP-A-2010-201949 includes a base plate to which an airbag body and an inflator are fixed. Further, the base plate is attached to a core metal of the steering wheel via a horn switch mechanism.

The horn switch mechanism includes a metal pin member, and a portion on a tip end side of the pin member is provided with a portion (neck portion) whose outer shape is partially narrowed. Meanwhile, a through hole is formed at a position, corresponding to the pin member, in the core metal of the steering wheel, and a clip made of a metal wire is attached to an edge portion of the through hole.

Further, when the airbag device is attached to the steering wheel, the tip end of the pin member is inserted into the through hole of the core metal, and the clip is fitted to a neck portion of the pin member. Therefore, the airbag device is locked to the core metal of the steering wheel, together with the horn switch mechanism.

In this state, when the airbag device (specifically, a pad portion which is a design part) is pushed toward a core metal side in order to operate a horn device, the base plate connected to the horn device and the core metal of the steering wheel connected to a vehicle ground are connected via the horn switch mechanism so as to operate the horn device. Meanwhile, when the airbag device is not pushed into the core metal side, the base plate and the core metal are not connected, and the horn device is not operated.

In the steering wheel described in JP-A-2010-201949, a tubular resin cap is attached to a tip end portion of the pin member of the horn switch mechanism. The resin cap is interposed between the pin member and the core metal in a state where an outer surface of the pin member and an inner surface of the through hole of the core metal are in contact with each other. Accordingly, since the resin cap formed of resin and the core metal formed of metal material are brought into contact with each other at a portion where the horn switch mechanism is engaged with the core metal, a sound generated at a contact surface is reduced as compared with a case where the metal pin member and the core metal are in contact with each other.

Here, when the airbag device is attached to the steering wheel, the clip is fitted to the neck portion of the pin member. Then, an inner surface of the neck portion of the pin member rubs against an outer surface of the clip, and therefore a contact state of the surfaces may vary. The engagement portion (contact portion) between the neck portion of the pin member and the clip constitutes a part of an electrical circuit which supplies power to the horn device during operation of the horn device. Therefore, the variation of the contact state between the neck portion of the pin member and the clip prevents improvement in the conductivity performance between the horn switch mechanism and the core metal.

SUMMARY

The present invention has been made in view of the above circumstances, and an object of the present invention is to provide a steering wheel capable of improving the conductivity performance between the horn switch mechanism and the core metal.

In order to solve the above problem, the present invention provides an steering wheel, in which an airbag device is attached to a core metal, including a through hole for attachment of the airbag device and being formed of metal material, via a horn switch mechanism which is configured to operate a horn device, the horn switch mechanism including: a metal pin member whose tip end portion is locked to the core metal via an engagement member to be engaged with the tip end portion in a state where the tip end portion is inserted into the through hole and which forms a part of an electrical circuit configured to operate the horn device; and a resin cap which is interposed between an inner surface of the through hole and an outer surface of the pin member without contacting the inner surface and the outer surface and which is formed of synthetic resin, the steering wheel including a plurality of connection paths configured to normally connect the pin member and the core metal in a manner of forming a part of the electrical circuit.

According to the above configuration, although the pin member of the horn switch mechanism and the core metal of the steering wheel are engaged so as to attach the airbag device, the pin member and the core metal can be electrically connected by each of the plurality of connection paths which form a part of the electrical circuit configured to operate the horn device. Accordingly, since reliability of the path connecting the pin member and the core metal is enhanced, the conductivity performance between the horn switch mechanism and the core metal can be improved.

In the steering wheel, the connection paths can adopt a first connection path in which the conductive engagement member is provided in a manner of being in contact with the outer surface of the core metal and the outer surface of the pin member, and a second connection path provided with a conductive connection member including: an inner contact portion which extends along an inner surface of the resin cap and is in contact with the outer surface of the pin member, an outer contact portion which extends along an outer surface of the resin cap and is in contact with the inner surface of the through hole, and a base portion which connects the inner contact portion and the outer contact portion into a whole.

In the steering wheel, it is preferable that the inner surface of the through hole and the outer surface of the resin cap at a portion where the inner surface and the outer surface are in contact are both tapered toward a tip end side of the pin member.

A force which causes the pin member and the core metal to move relative to each other in an axial direction of the pin member may act on the engagement portion between the pin member and the core metal due to vibration of the vehicle including the above steering wheel or operation of the horn switch mechanism by a driver, etc.

According to the above configuration, the steering wheel may have a structure in which the core metal is sandwiched between the engagement member and the resin cap. Therefore, when a force which pulls the pin member out of the through hole of the core metal acts as the above force, a surface pressure of a contact portion (second contact portion), which is between the connection member and the core metal and forms a part of the second connection path, is decreased, but a surface pressure of a contact portion (first contact portion) which is between the engagement portion and the core metal and forms a part of the first connection path, is increased. At this time, proper conduction between the horn switch mechanism and the core metal can be obtained via the first contact portion of the first connection path where the surface pressure is high. Meanwhile, when a force which pushes the pin member into the through hole of the core metal acts as the above force, the surface pressure of the first contact portion which forms a part of the first connection path is decreased, but the surface pressure of the second contact portion which forms a part of the second connection path is increased. At this time, proper conduction between the horn switch mechanism and the core metal can be obtained via the second contact portion of the second connection path where the surface pressure is high.

Thus, according to the above configuration, even if a force acts to move the pin member relative to the core metal in the axial direction of the pin member, one of the surface pressure of the first contact portion which forms a part of the first connection path and the surface pressure of the second contact portion which forms a part of the second connection path is maintained high. Accordingly, since the conductivity performance of either of the first connection path and the second connection path can be maintained high, the conductivity performance between the horn switch mechanism and the core metal can be maintained high.

In order to solve the above problem, the present invention provides a steering wheel, in which an airbag device is attached to a core metal, including a through hole for attachment of the airbag device and being formed of metal material, via a horn switch mechanism which is configured to operate a horn device, the horn switch mechanism including: a metal pin member whose tip end portion is locked to the core metal via an engagement member to be engaged with the tip end portion in a state where the tip end portion is inserted into the through hole and which forms a part of an electrical circuit configured to operate the horn device; and a resin cap which is interposed between an inner surface of the through hole and an outer surface of the pin member without contacting the inner surface and the outer surface and which is formed of synthetic resin, the steering wheel including a conductive connection member including: an inner contact portion which extends along an inner surface of the resin cap and is in contact with the outer surface of the pin member; an outer contact portion which extends along an outer surface of the resin cap and is in contact with the inner surface of the through hole; and a base portion which connects the inner contact portion and the outer contact portion into a whole.

In the above configuration, when the engagement member is engaged with the tip end portion of the pin member so as to attach the airbag device, a contact state of the engagement portion (specifically, the contact surface) of the pin member and the engagement member may vary.

According to the above configuration, a path not including the engagement member, that is, a path constituted by the connection member can be set as a path configured to normally connect the pin member and the core metal in a manner of forming a part of the electrical circuit which operates the horn device. Therefore, a path not including the engagement portion between the pin member and the engagement member (that is, the portion where the contact state may vary) can be set as a path configured to normally connect the pin member and the core metal. Therefore, the conductivity performance between the horn switch mechanism and the core metal can be improved.

In the steering wheel, it is preferable that the inner surface of the through hole and the outer surface of the resin cap at a portion where the inner surface and the outer surface are in contact are both tapered toward a tip end side of the pin member.

According to the above configuration, by providing the resin cap such that the outer surface of the resin cap is pressed against the inner surface of the through hole, the contact surface pressure thereof can be high. Therefore, the outer contact portion of the connection member which forms a part of the path configured to electrically connect the pin member and the core metal can be disposed in such a portion where the contact surface pressure is high. Accordingly, since the contact surface pressure between the outer contact portion and the inner surface of the through hole can be easily increased, the conductivity performance between the horn switch mechanism and the core metal can be improved.

In the steering wheel, it is preferable that the horn switch mechanism includes a compression spring which is inserted through the pin member and urges a portion of the resin cap on an airbag device side toward a core metal side, and the base portion has an annular shape and is sandwiched and held between the compression spring and the resin cap in a state where the pin member is inserted.

According to the above configuration, by sandwiching and holding the base portion of the connection member between the compression spring and the resin cap, the connection member can be firmly supported in the horn switch mechanism.

The conductivity performance between the horn switch mechanism and the core metal can be improved according to the present invention.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 1A:
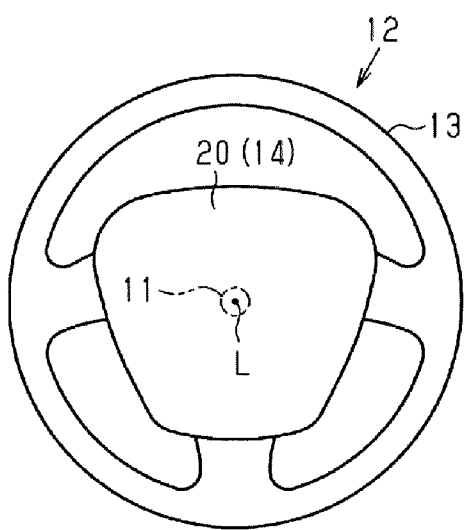
FIG. 1A is a front view of a steering wheel according to an embodiment.
Figure 1B:
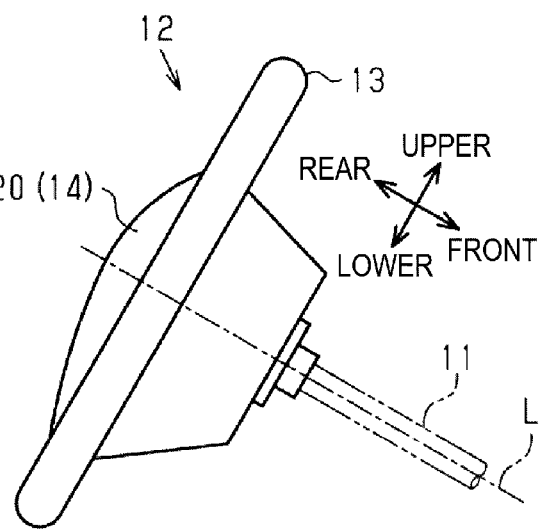
FIG. 1B is a side view of the steering wheel.

Hereinafter, an embodiment of a steering wheel will be described. As shown in FIGS. 1A and 1B, a steering shaft 11, which is an operating shaft, is disposed in front (right side in FIG. 1B) of a driver seat of a vehicle. The steering shaft 11 is disposed in a state of being inclined so as to be at a higher position toward a driver seat side (left side in FIG. 1B). A steering wheel 12 is integrally and rotatably attached to an end on the driver seat side of the steering shaft 11.

Hereinafter, a direction along a rotation axis L of the steering shaft 11 is referred to as a "front-rear direction" of the steering wheel 12, and among directions along a plane orthogonal to the rotation axis L, a direction in which the steering wheel 12 stands up is referred to as an "upper-lower direction". Therefore, the front-rear direction and the upper-lower direction of the steering wheel 12 are slightly inclined with respect to a front-rear direction (horizontal direction) and an upper-lower direction (vertical direction) of a vehicle.

The steering wheel 12 includes a wheel body 13 which is a part rotationally operated by a driver when changing a traveling direction of the vehicle, and an accessory device 14 which is integrally attached to the wheel body 13.

Figure 2:
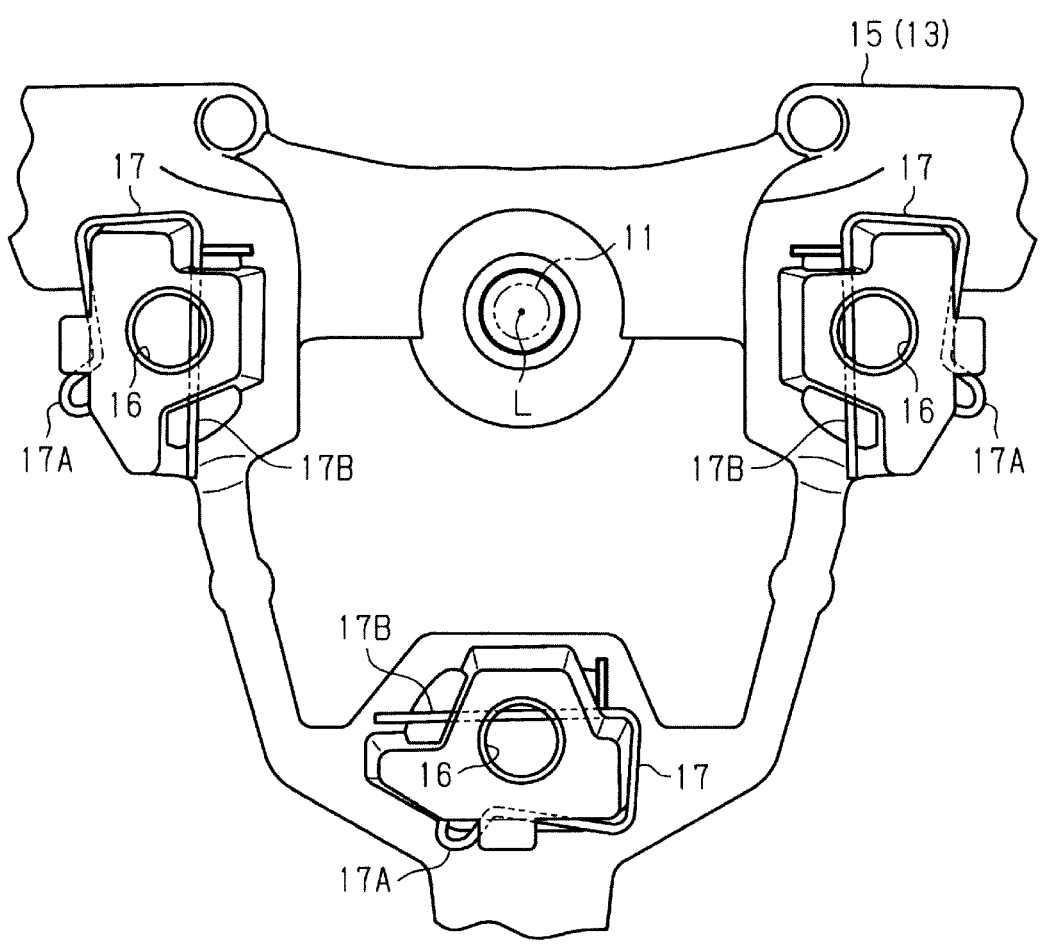
FIG. 2 is a partial front view of a core metal of the steering wheel.

As shown in FIG. 2, the wheel body 13 includes a core metal 15 formed of metal material (aluminum alloy). The core metal 15 is integrally and rotatably fixed to the steering shaft 11. A vehicle ground (more specifically, a negative electrode of an in-vehicle battery) is connected to the core metal 15.

The core metal 15 includes through holes 16 each of which having a circular cross section extending in the front-rear direction. The through holes 16 are provided (three in total) at a position on the left side, a position on the right side, and a position on the lower side of the rotation axis L separately in a state (the state shown in FIG. 2) where the core metal 15 is viewed from the driver seat side. Each through hole 16 has a tapered shape whose inner diameter gradually decreases from the rear side (driver seat side) toward the front side.

A clip 17 is attached to a position corresponding to each of the through holes 16 in the core metal 15. The clip 17 is formed in a substantially U-shape by an elastic metal (iron alloy) wire. Each clip 17 is engaged with the core metal 15 in a state where the movement in a direction of the rotation axis L (direction orthogonal to the plane of FIG. 2) is restricted. In addition, one end portion (securing portion 17A) of the clip 17 is locked to a front surface of the core metal 15, and the other end portion (engagement portion 17B) of the clip 17 can be elastically deformed in a manner of being relatively movable in a direction along the front surface of the core metal 15. Further, a part of the engagement portion 17B of the clip 17 extends in a manner of passing a front side of an opening portion of the through hole 16 of the core metal 15.

Horn switch mechanisms, each of which is configured to operate a horn device, and an airbag device are incorporated in the accessory device 14 (FIG. 1). The accessory device 14 is attached to the wheel body 13 through engagement between the clips 17 attached to the core metal 15 (FIG. 2) and the horn switch mechanisms. An engagement manner of the clip 17 and the horn switch mechanism will be described in detail later.

Hereinafter, a structure of the accessory device 14 will be described in detail.

Figure 3:
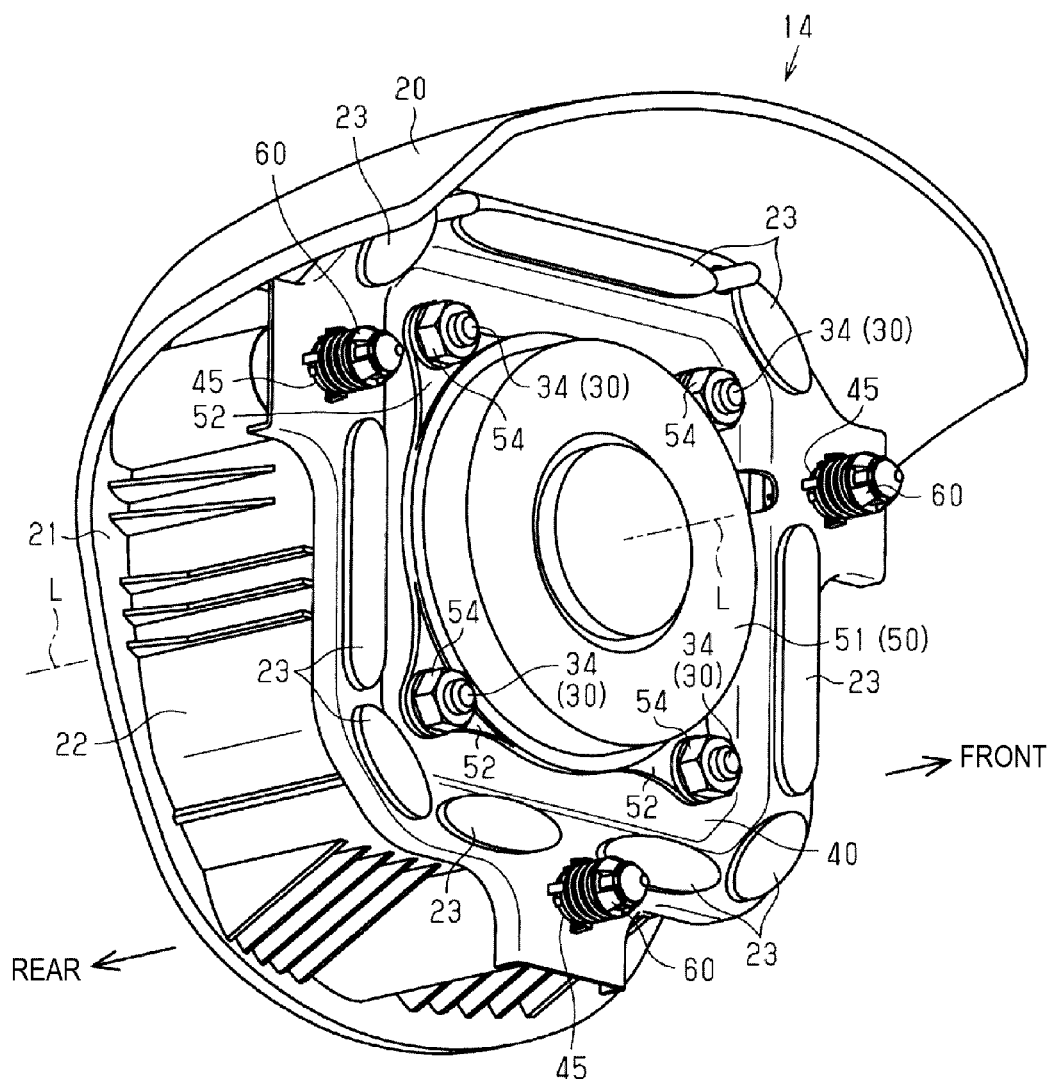
FIG. 3 is a perspective view of an accessory device.
Figure 4:
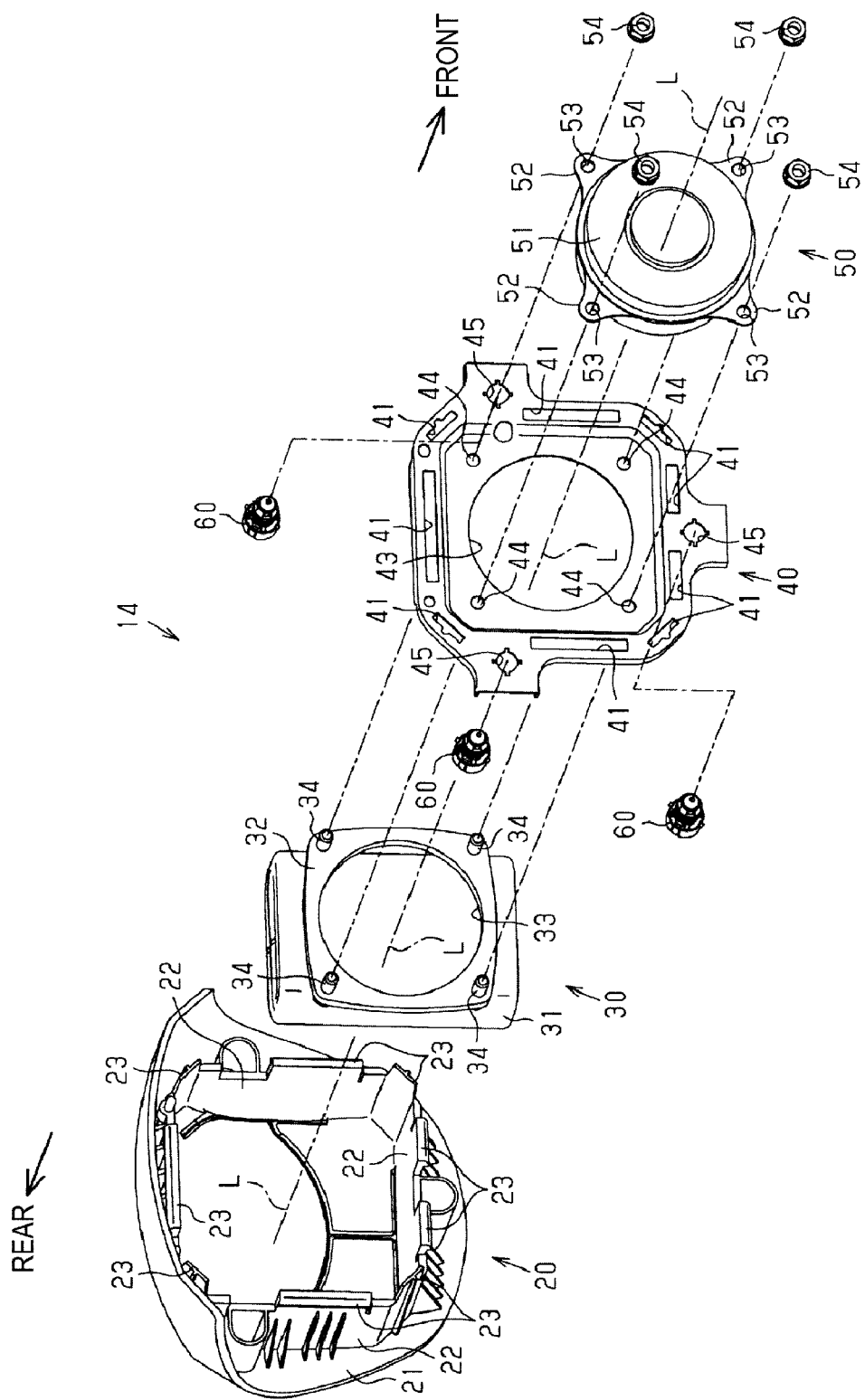
FIG. 4 is an exploded perspective view of the accessory device.

As shown in FIG. 3 and FIG. 4, the accessory device 14 includes a pad portion 20, an airbag body 30, a base plate 40, and an inflator 50 which are arranged from the rear side (driver seat side) toward the front side.

The pad portion 20 is formed of synthetic resin material, and includes an outer cover 21 whose outer surface is a design surface, and an accommodation wall 22 protruding in a substantially rectangular tube shape from a front surface of the outer cover 21. An outer surface on the driver seat side of the accessory device 14 is covered by the outer cover 21 of the pad portion 20. In addition, the airbag body 30 is accommodated in a portion surrounded by the outer cover 21 and the accommodation wall 22. A plurality of (nine in the present embodiment) caulking claws 23 are provided and project at a front end of the accommodation wall 22. Each caulking claw 23 is used to attach the pad portion 20 to the base plate 40.

The airbag body 30 includes a bag portion 31 (FIG. 4) in which an airbag in a folded state is accommodated and a substantially square plate-shaped retainer 32 which is provided forward of the bag portion 31 and to which the bag portion 31 is fixed. A through hole (gas hole 33) through which gas for inflating the airbag passes is formed at a center of the retainer 32. Four mounting screws 34 which project forward are provided at four corners of the retainer 32 integrally therewith.

The base plate 40 is formed of metal material (iron alloy) into a substantially rectangular plate shape. The horn device (more specifically, a positive electrode of a vehicle battery and an alarming horn) is connected to the base plate 40. A plurality of (nine in the present embodiment) caulking holes 41 are provided at an edge portion of the base plate 40. The caulking holes 41 are formed at positions corresponding to the caulking claws 23 of the pad portion 20. Further, the caulking claws 23 of the pad portion 20 are inserted into the caulking holes 41 of the base plate 40, and front ends of the caulking claws 23 are thermally caulked. The pad portion 20 is fixed to the base plate 40 by the heat caulking.

A through hole (gas hole 43) through which gas passes is formed at a center of the base plate 40. Insertion holes 44 are formed at four corners of the base plate 40. The mounting screws 34 of the bag portion 31 are inserted through the insertion holes 44. Further, the base plate 40 includes through holes (mounting holes 45) used to mount horn switch mechanisms 60. The mounting holes 45 are provided (three in total) at a position on the right side, a position on the left side, and a position on the lower side of the gas hole 43 separately in a state where the base plate 40 is viewed from the driver seat side (rear side). Further, the horn switch mechanisms 60 are locked to the base plate 40 in a state of being inserted through the mounting holes 45.

The inflator 50 includes a functional portion 51 which has a substantially cylindrical shape and is arranged such that a center of the cylindrical shape coincides with the rotation axis L. The functional portion 51 generates gas for inflating the airbag in the bag portion 31 in response to an input of a signal from a control device (not shown). The inflator 50 includes four flanges 52 projecting from an outer peripheral surface of the functional portion 51. The flanges 52 are provided at equal angular intervals around the rotation axis L. Each flange 52 is provided with an insertion hole 53 extending in the direction of the rotational axis L. The mounting screws 34 of the bag portion 31 are inserted through the insertion holes 53.

Assembling of the accessory device 14 is performed, for example, as follows. First, each mounting screw 34 of the bag portion 31 is inserted into the insertion hole 44 of the base plate 40 and the insertion hole 53 of the inflator 50. Further, nuts 54 are screwed to each mounting screw 34 in this state. Accordingly, in a state where the base plate 40 is sandwiched between the bag portion 31 and the inflator 50, the bag portion 31, the inflator 50 and the base plate 40 are integrally fixed. At the same time, the three horn switch mechanisms 60 are inserted into the mounting holes 45 of the base plate 40 and are attached to the base plate 40.

Thereafter, in a state where the bag portion 31 is accommodated in the pad portion 20, the integrally fixed bag portion 31, base plate 40 and inflator 50 are fitted to the pad portion 20, and each caulking claw 23 of the pad portion 20 is inserted into the each caulking hole 41 of the base plate 40 and thermally caulked.

Accordingly, the pad portion 20, the bag portion 31, the base plate 40, the inflator 50, and the horn switch mechanism 60 become an integrated structure (a structure shown in FIG. 3). Hereinafter, a structure of the horn switch mechanism 60 will be described in detail.

Figure 5:
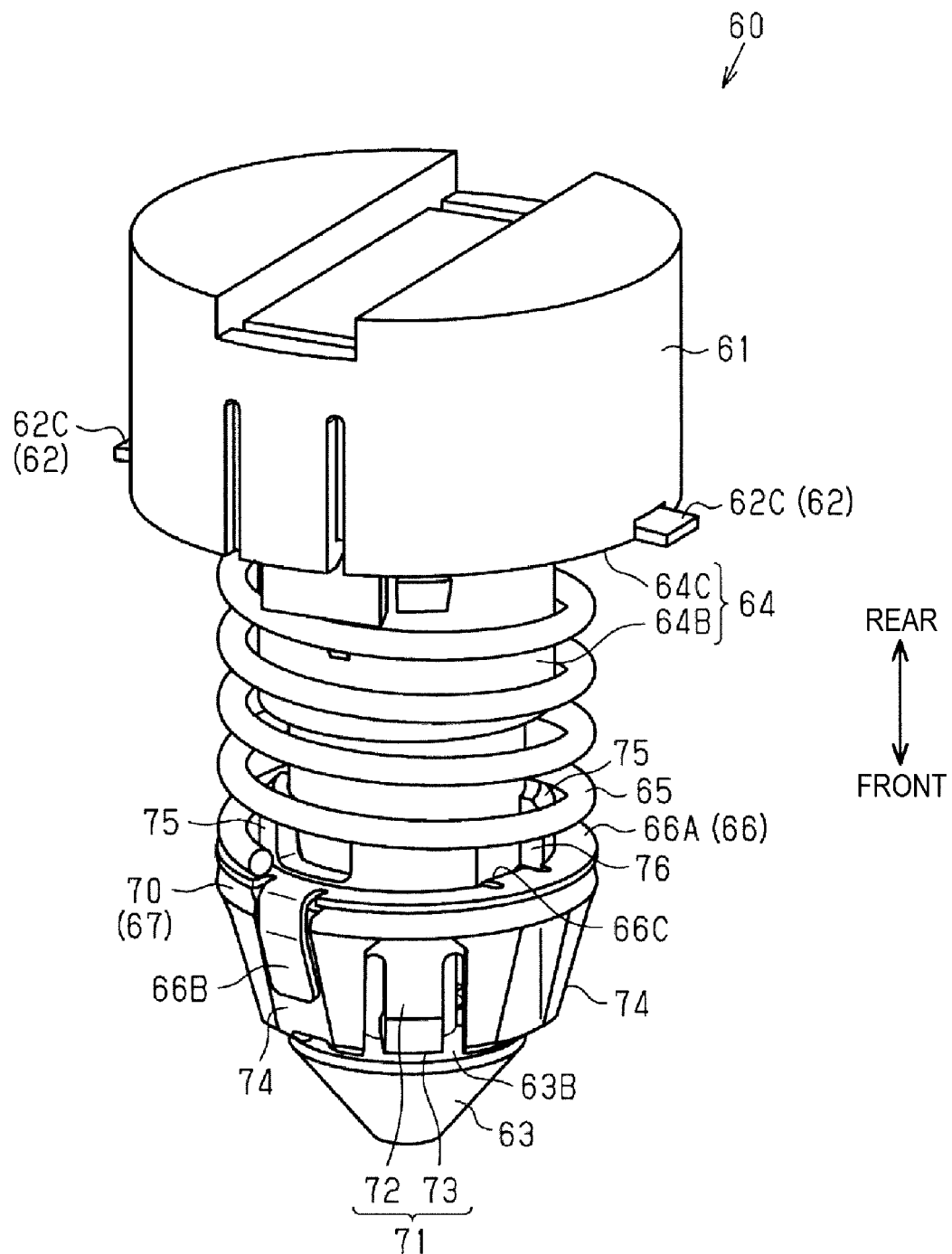
FIG. 5 is a perspective view of a horn switch mechanism.
Figure 6:
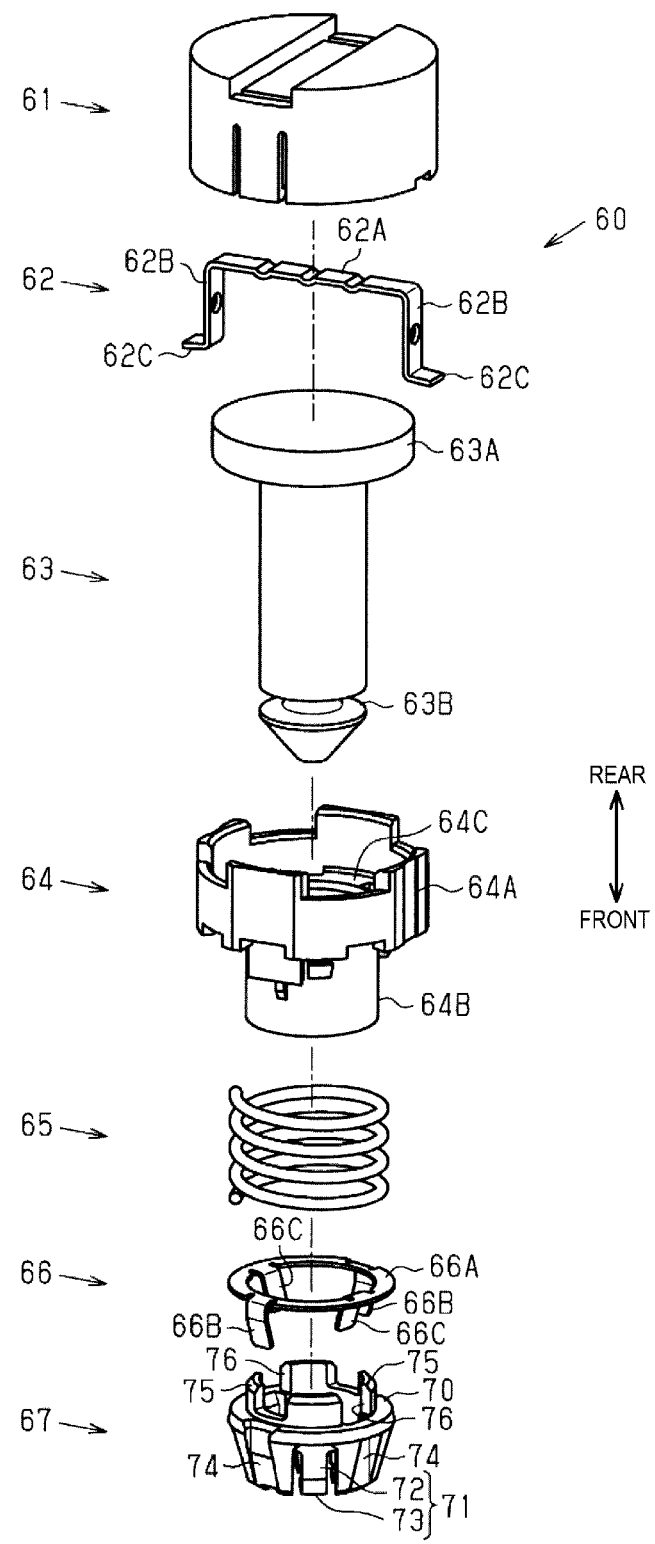
FIG. 6 is an exploded perspective view of the horn switch mechanism.

As shown in FIG. 5 and FIG. 6, the horn switch mechanism 60 includes a cap member 61, a contact terminal 62, a pin member 63, a base member 64, a compression coil spring 65, a connection member 66, and a resin cap 67.

The cap member 61 has a cylindrical shape with a lid. The cap member 61 is formed of synthetic resin which is an insulating material. The contact terminal 62 is formed of an elongated metal (copper) plate. The contact terminal 62 is disposed inside the cap member 61 in a manner of extending along an inner surface of the cap member 61. Specifically, the contact terminal 62 includes an upper portion 62A extending along an inner surface of the lid of the cap member 61, a pair of side portions 62B projecting from both ends of the upper portion 62A and extending along an inner surface of a peripheral wall of the cap member 61, and exposed portions 62C extending from ends of the side portions 62B and exposed to an outside of the cap member 61. In a state where the horn switch mechanism 60 is attached to the mounting hole 45 of the base plate 40 (the state shown in FIG. 3), the exposed portions 62C of the contact terminal 62 are in contact with an outer surface of the base plate 40 in a pressed state.

The pin member 63 is formed of metal material (iron alloy). The pin member 63 has a substantially cylindrical shape. A base end (upper end in FIG. 6) of the pin member 63 is a flange portion 63A whose outer diameter is partially enlarged. A tip end portion of the pin member 63 is tapered toward a tip end thereof. Further, on a base end side of the tip end portion of the pin member 63, a neck portion 63B whose outer diameter is partially reduced in diameter is provided.

The base member 64 is formed of synthetic resin which is an insulating material. The base member 64 has a stepped, substantially cylindrical shape in which an outer shape of a base end portion (large diameter portion 64A) is larger than an outer shape of a tip end portion (small diameter portion 64B). The pin member 63 is inserted into the base member 64 from the base end side thereof. The pin member 63 is movable relative to the base member 64 in an axial direction.

In the present embodiment, an inner diameter of the large diameter portion 64A of the base member 64 is larger than an outer diameter of the flange portion 63A of the pin member 63, and an inner diameter of the small diameter portion 64B of the base member 64 is smaller than the outer diameter of the flange portion 63A of the pin member 63. Further, the flange portion 63A of the pin member 63 is disposed inside the large diameter portion 64A of the base member 64, and the flange portion 63A abuts on a boundary (stage portion 64C) between the large diameter portion 64A and the small diameter portion 64B.

The cap member 61 having a cylindrical shape with a lid is fitted to the large diameter portion 64A of the base member 64 in such a manner of closing an opening of the base member 64. Further, in a state where the cap member 61 is fitted to the large diameter portion 64A of the base member 64, the contact terminal 62 in the cap member 61 and the flange portion 63A of the pin member 63 are spaced apart in the axial direction (a non-contact state).

In the present embodiment, the contact terminals 62 and the flange portion 63A correspond to a contact portion which switches between conduction and non-conduction of an electrical circuit (hereinafter, horn circuit) for operating the horn device. Further, in the horn switch mechanism 60 of the present embodiment, the contact terminal 62 in the cap member 61 and the flange portion 63A of the pin member 63 are basically not in contact with each other (the contact portion is in a non-conductive state). Further, when a driver presses the pad portion 20 (see FIG. 4) or the like and the cap member 61 and the pin member 63 move relative to each other in a direction of approaching each other, the flange portion 63A of the pin member 63 abuts on and contacts the upper portion 62A of the contact terminal 62 (the contact portion is in a conductive state).

Figure 7A:
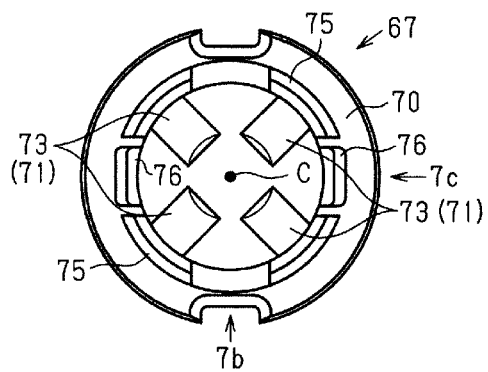
FIG. 7A is a planar view of a resin cap.
Figure 7B:
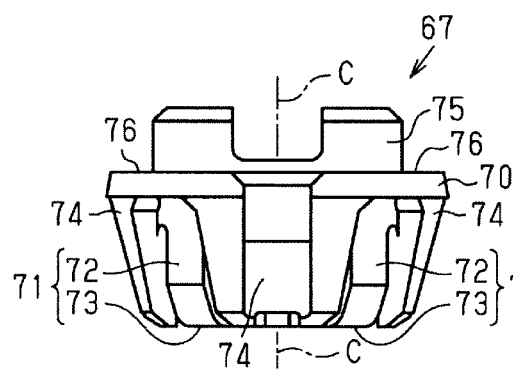
FIG. 7B is a view taken in a direction of an arrow 7b in FIG. 7A.
Figure 7C:
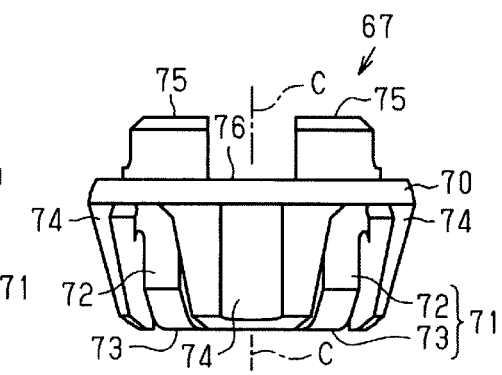
FIG. 7C is a view taken in a direction of an arrow 7c in FIG. 7A.

As shown in FIGS. 7A, 7B and 7C, the resin cap 67 includes a base annular portion 70 which forms an annular shape.

The resin cap 67 includes locking pieces 71 projecting from an inner edge of the base annular portion 70 to the front side (lower side in FIG. 7B). Four locking pieces 71 are provided at equal intervals around a center line C. Each locking piece 71 includes an arm portion 72 extending from the base annular portion 70 along the center line C, and a claw portion 73 bent at a tip end of the arm portion 72 and extends inward.

Further, the resin cap 67 includes four contact pieces 74 projecting to the front side from an outer edge of the base annular portion 70. The contact pieces 74 are provided at positions sandwiched by adjacent locking pieces 71, respectively. In the present embodiment, an outer surface of the contact piece 74 corresponds to a contact portion in contact with an inner surface of the through hole 16 of the core metal 15, and the outer surface of the contact piece 74 is tapered toward the front side. Specifically, the outer surface of the contact piece 74 extends obliquely with respect to the central line C so as to be closer to the central line C toward the tip end.

The resin cap 67 also includes two spring receiving portions 75 projecting to the rear side (upper side in FIG. 7B) from the inner edge of the base annular portion 70. Each spring receiving portion 75 has an arc shaped cross section in which the arc-shaped portion of the inner edge of the base annular portion 70 projects to the rear side, and is provided at equal intervals around the center line C. A rear side portion of the base annular portion 70 includes portions (cutout portions 76) in which the spring receiving portions 75 are not provided.

The resin cap 67 also includes two spring receiving portions 75 projecting to the rear side (upper side in FIG. 7B) from the inner edge of the base annular portion 70. Each spring receiving portion 75 has an arc shaped cross section in which the arc-shaped portion of the inner edge of the base annular portion 70 projects to the rear side, and is provided at equal intervals around the center line C. A rear side portion of the base annular portion 70 includes portions (cutout portions 76) in which the spring receiving portions 75 are not provided.

The compression coil spring 65 is inserted into the pin member 63. The small diameter portion 64B of the base member 64 is inserted into one end of the compression coil spring 65, and the spring receiving portion 75s of the resin caps 67 are inserted into the other end. The compression coil spring 65 is interposed between the base annular portion 70 of the resin cap 67 and the stage portion 64C of the base member 64 in a compressed state.

The resin cap 67 is constantly urged in a direction of being separated from the base member 64 by an urging force of the compression coil spring 65. For this reason, in a state where only the claw portions 73 of the locking pieces 71 of the resin cap 67 are sandwiched by the neck portion 63B of the pin member 63 (the state shown in FIG. 5), a tip end of the claw portion 73 is pressed against a tip end portion of an inner surface of the neck portion 63B of the pin member 63. Since the pin member 63 (neck portion 63B) is pressed to the front side via the resin cap 67, the pin member 63 is constantly urged to the front side (tip end side) with respect to the base member 64.

Figure 8A:
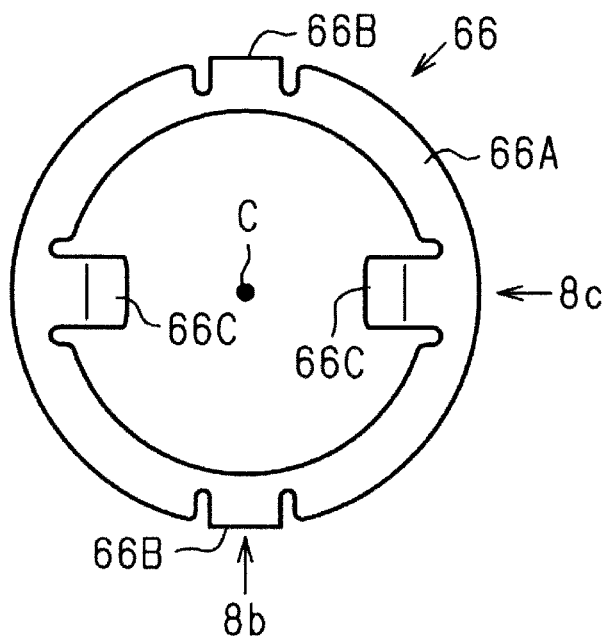
FIG. 8A is a planar view of a connection member.
Figure 8B:
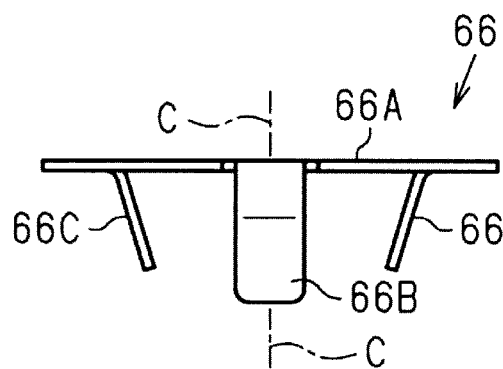
FIG. 8B is a view taken in a direction of an arrow 8b in FIG. 8A.
Figure 8C:
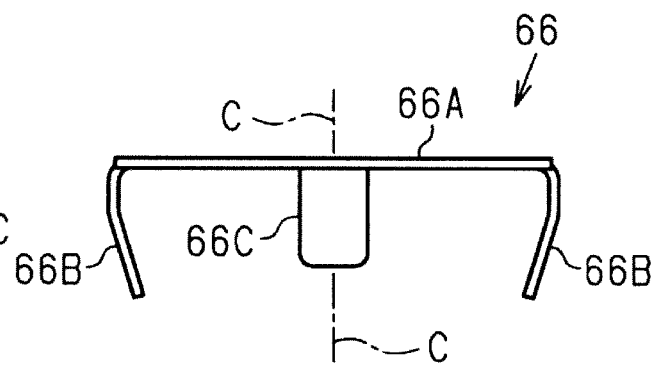
FIG. 8C is a view taken in a direction of an arrow 8c in FIG. 8A.

As shown in FIG. 8A, FIG. 8B and FIG. 8C, the connection member 66 is formed of conductive material (copper in the present embodiment) into a plate shape. The connection member 66 includes an annular base portion 66A. The pin member 63 (with reference to FIG. 6) is inserted through the base portion 66A and the base portion 66A is sandwiched between a tip end of the compression coil spring 65 and the base annular portion 70 of the resin cap 67.

The connection member 66 includes two outer contact portions 66B projecting to the front side (lower side in FIG. 8C) from an outer edge of the base portion 66A. The outer contact portions 66B are provided at equal intervals around the center line C. Each outer contact portion 66B is shaped such that a tip end thereof is positioned to be closer to the center line C than a base end thereof, and is curved so as to be convex outward (in a direction away from the center line C) from the base end to the tip end. Each outer contact portion 66B is arranged in a manner of extending along the outer surface of the contact piece 74 of the resin cap 67 (with reference to FIG. 5).

Further, the connection member 66 includes two inner contact portions 66C projecting to the front side from an inner edge of the base portion 66A. The inner contact portions 66C are provided at equal intervals around the center line C. Each inner contact portion 66C has a shape of being closer to the center line C toward the tip end, and is shaped such that a distance between the two inner contact portions 66C is narrowed toward the tip end. Further, each inner contact portion 66C extends to and along an inner surface of the resin cap 67 (an inner surface of the base annular portion 70) in a manner of passing through the cutout portions 76 of the resin cap 67 (with reference to FIG. 6).

Figure 9A:
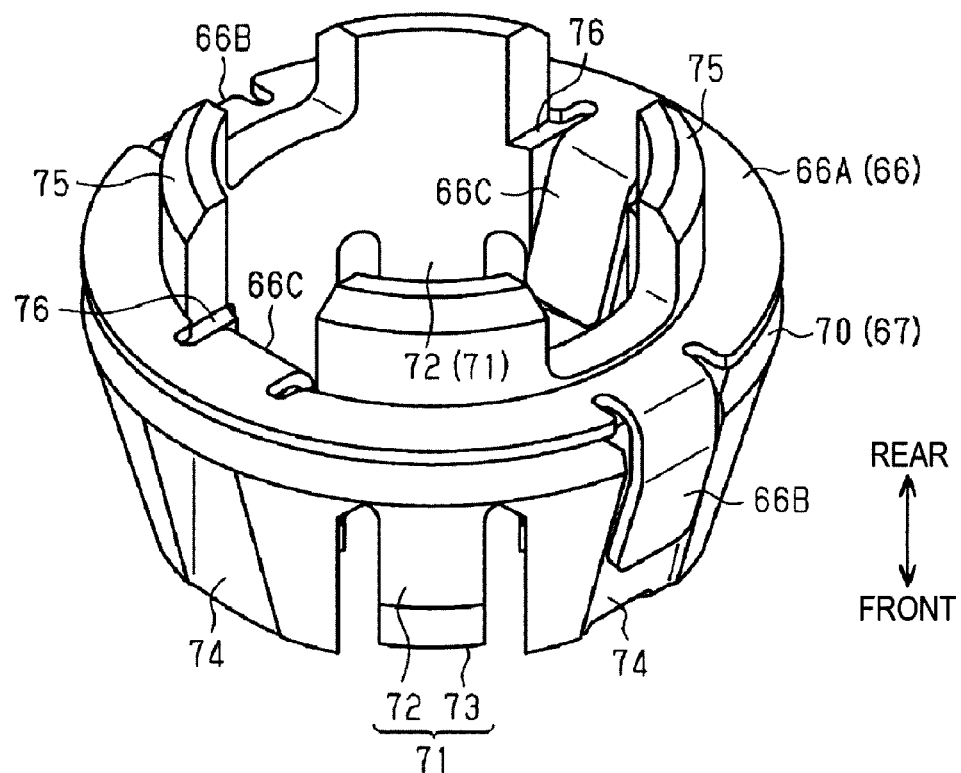
FIGS. 9A and 9B are perspective views of the resin cap and the connection member in a temporarily fixed state.
Figure 9B:
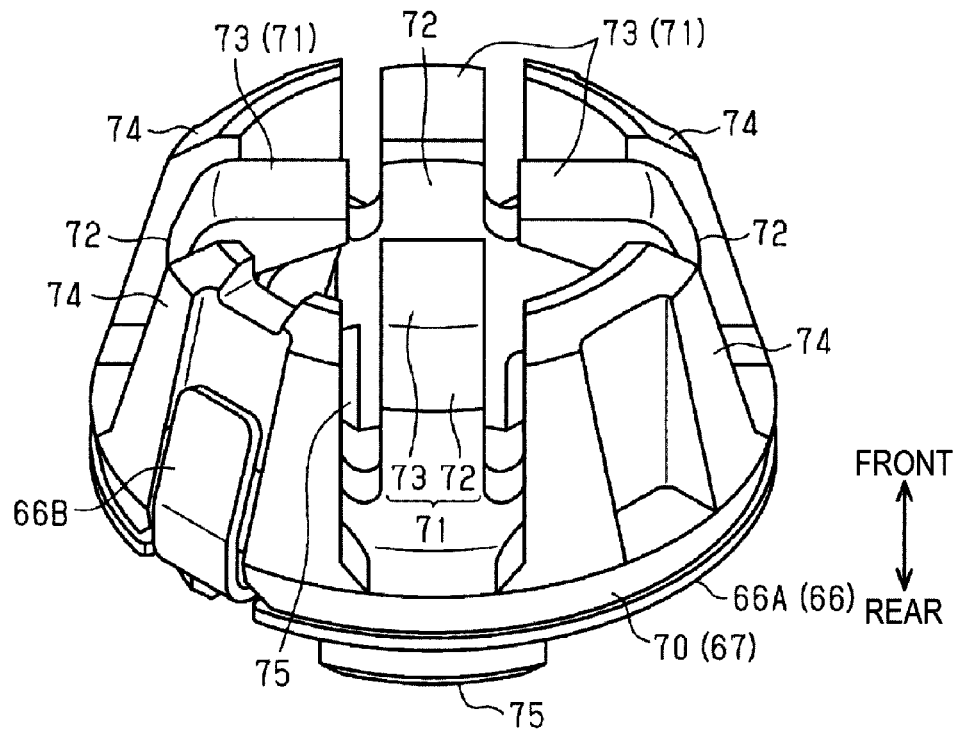

In the horn switch mechanism 60 of the present embodiment, as shown in FIG. 9A and FIG. 9B, it is possible to temporarily fix the connection member 66 to the resin cap 67 during assembling thereof.

First, in the temporary fixing, positions of the cutout portions 76 of the resin cap 67 and positions of the inner contact portions 66C of the connection member 66 match in a state where the resin cap 67 and the connection member 66 are viewed from the rear side, and positions of the contact pieces 74 of the resin cap 67 and positions of the outer contact portions 66B of the connection member 66 match in the same state.

Then, the connection member 66 is moved to the resin cap 67 side until the base portion 66A of the connection member 66 abuts on the base annular portion 70 of the resin cap 67 while the pair of outer contact portions 66B are elastically deformed such that a distance therebetween increases.

Accordingly, the inner contact portions 66C of the connection member 66 pass through the cutout portions 76 of the resin cap 67 and extend along the inner surface of the resin cap 67, and the outer contact portions 66B of the connection member 66 recover from the elastically deformed state and extend along outer surfaces of the contact pieces 74 of the resin cap 67.

In this way, by temporarily fixing the connection member 66 to the resin cap 67, the outer surfaces of the pair of contact pieces 74 whose distance is narrowed toward the tip end thereof are sandwiched by the pair of outer contact portions 66B whose distance is also narrowed toward the tip end thereof. In this state, movement of the connection member 66 in the direction of coming off from the resin cap 67 is restricted through the contact between the outer surface of the resin cap 67 and inner surfaces of the outer contact portions 66B of the connection member 66. In this way, the connection member 66 can be supported by the resin cap 67 in a state of not coming off easily. Accordingly, the horn switch mechanism 60 can be easily assembled.

Assembling of the horn switch mechanism 60 is performed as follows. As shown in FIG. 5 and FIG. 6, first, the tip end of the pin member 63 is inserted from a large diameter portion 64A side of the base member 64, and therefore the pin member 63 is inserted into the base member 64. Next, the contact terminal 62 is attached to the cap member 61, and the cap member 61 is fitted to the large diameter portion 64A of the base member 64.

Then, the compression coil spring 65, and the temporarily fixed resin cap 67 and connection member 66 are inserted into the pin member 63 from the tip end of the pin member 63 in the order of the compression coil spring 65, and the resin cap 67 and the connection member 66 which are in the temporarily fixed state.

At this time, since the claw portions 73 of the locking pieces 71 of the resin cap 67 are fitted to the neck portion 63B of the pin member 63, the resin cap 67 does not come off from the pin member 63. Moreover, the compression coil spring 65 is interposed between the base member 64 and the resin cap 67 in a compressed state. Further, the base portion 66A of the connection member 66 is sandwiched and held between the tip end of the compression coil spring 65 and the base annular portion 70 of the resin cap 67. Accordingly, the connection member 66 can be firmly supported in the horn switch mechanism 60.

Figure 10:
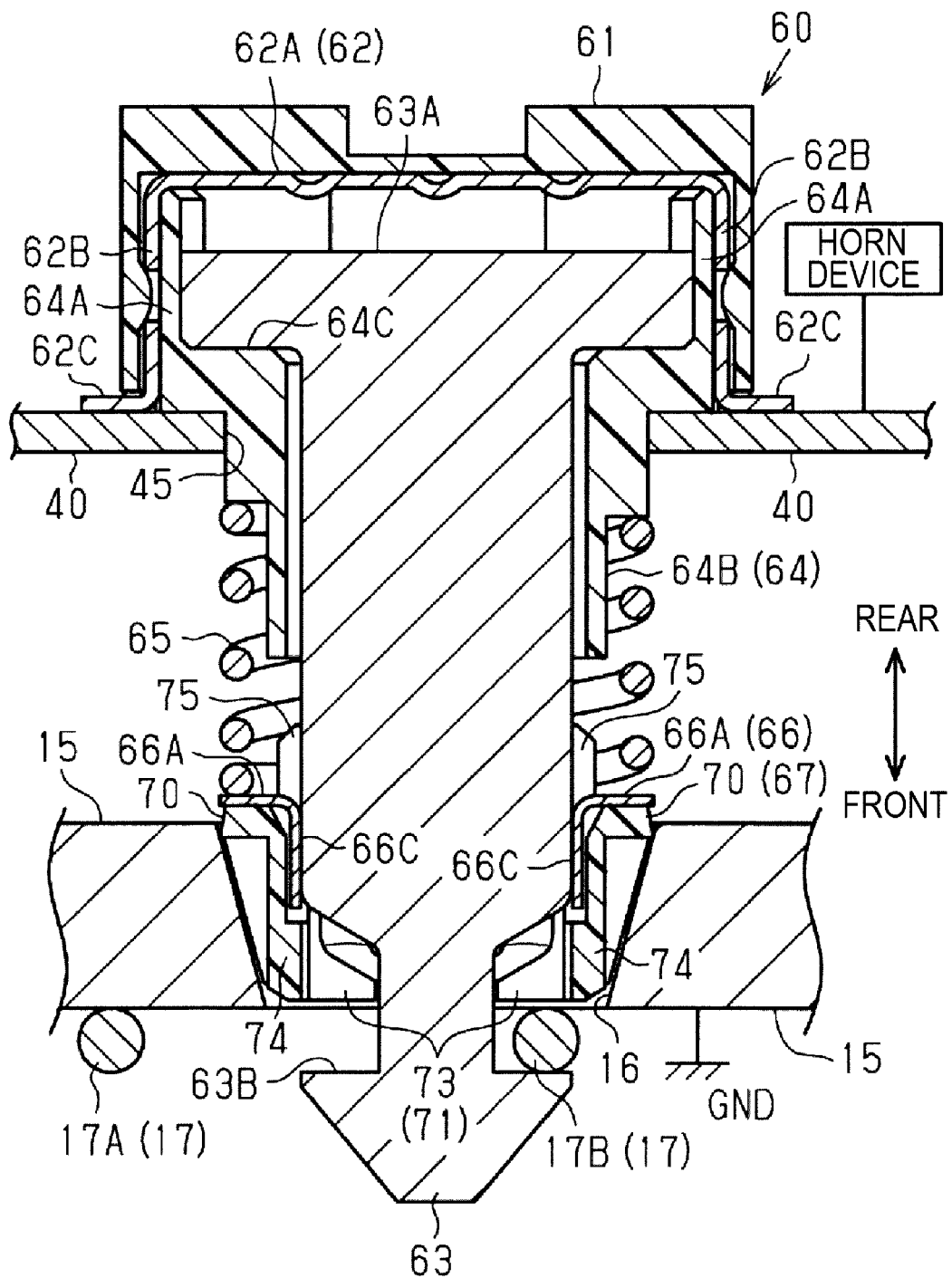
FIG. 10 is a cross-sectional view of the horn switch mechanism and arrangement of a portion in an inner contact portion in a periphery thereof.

As shown in FIG. 10, in the horn switch mechanism 60, inner surfaces of the inner contact portions 66C of the connection member 66 are in contact with the outer surface of the pin member 63. In the present embodiment, the contact portions between the inner contact portions 66C and the pin member 63 form a part of an electrical circuit (horn circuit) for operating the horn device. Further, the pin member 63 and the connection member 66 are electrically connected via the contact portion between the inner contact portions 66C and the pin member 63.

In the present embodiment, each inner contact portion 66C (with reference to FIG. 8) has a shape of being closer to the center line C toward the tip end thereof, and is shaped such that a distance between the two inner contact portions 66C is narrowed toward the tip end. Therefore, the pin member 63 is disposed between the inner contact portions 66C in a state where the pair of inner contact portions 66C is elastically deformed such that the inner contact portions 66C are pushed to open. Therefore, the inner surfaces of the inner contact portions 66C and the outer surface of the pin member 63 are in contact (conductive) reliably.

In the present embodiment, the attachment of the accessory device 14 to the wheel body 13 is performed by locking the horn switch mechanism 60 integral with the accessory device 14 to the core metal 15 (specifically, the clip 17) of the wheel body 13.

Specifically, in the attachment, the tip end of the pin member 63 of the horn switch mechanism 60 is pushed into the through hole 16 of the core metal 15 so as to insert the pin member 63 into the through hole 16. Since the tip end portion of the pin member 63 has a tapered shape, the engagement portion 17B (with reference to FIG. 2) of the clip 17 is elastically deformed in a manner of being displaced by the tip end portion of the pin member 63 along with the insertion of the pin member 63 into the through hole 16. Further, the tip end portion of the pin member 63 passes through the through hole 16 of the core metal 15 and projects (is exposed) to the front side of the core metal 15.

Meanwhile, in the process of inserting the pin member 63 into the through hole 16 of the core metal 15, the resin cap 67 comes to a state of being fitted into the through hole 16 (specifically, a state where the outer surfaces of the contact pieces 47 of the resin cap 67 abut against the inner surface of the through hole 16 of the core metal 15) and stays in the state.

Therefore, after that, the pin member 63 is inserted into the through hole 16 while the resin cap 67 is relatively moved in a direction approaching the base member 64 against an urging force of the compression coil spring 65. Due to the relative movement of the resin cap 67, a gap is generated between an inner surface on the tip end side of the neck portion 63B of the pin member 63 and the tip end of the resin cap 67. Further, when the gap is increased, the engagement portion 17B of the clip 17 is restored from the elastically deformed state and fitted in the gap. Accordingly, the clip 17 locked in the core metal 15 is engaged with the neck portion 63B of the pin member 63 (the state shown in FIG. 10).

Therefore, after that, the pin member 63 is inserted into the through hole 16 while the resin cap 67 is relatively moved in a direction approaching the base member 64 against an urging force of the compression coil spring 65. Due to the relative movement of the resin cap 67, a gap is generated between an inner surface on the tip end side of the neck portion 63B of the pin member 63 and the tip end of the resin cap 67. Further, when the gap is increased, the engagement portion 17B of the clip 17 is restored from the elastically deformed state and fitted in the gap. Accordingly, the clip 17 locked in the core metal 15 is engaged with the neck portion 63B of the pin member 63 (the state shown in FIG. 10).

In the present embodiment, movement of the horn switch mechanism 60 in the front-rear direction is restricted through the engagement between the clip 17 locked to the core metal 15 and the neck portion 63B of the pin member 63. In the present embodiment, all of the three horn switch mechanisms 60 are thus locked to the core metal 15. Accordingly, the accessory device 14 is attached to the wheel body 13.

In the state where the attachment of the accessory device 14 is completed and the pressing of the horn switch mechanism 60 in the insertion direction (front side) is stopped, the urging force of the compression coil spring 65 acts to reduce the distance between the inner surface on the tip end side of the neck portion 63B of the pin member 63 and the tip end of the resin cap 67. At this time, since the engagement portion 17B of the clip 17 is sandwiched and held between the inner side surface of the neck portion 63B of the pin member 63 and the tip end of the resin cap 67.

Figure 11:
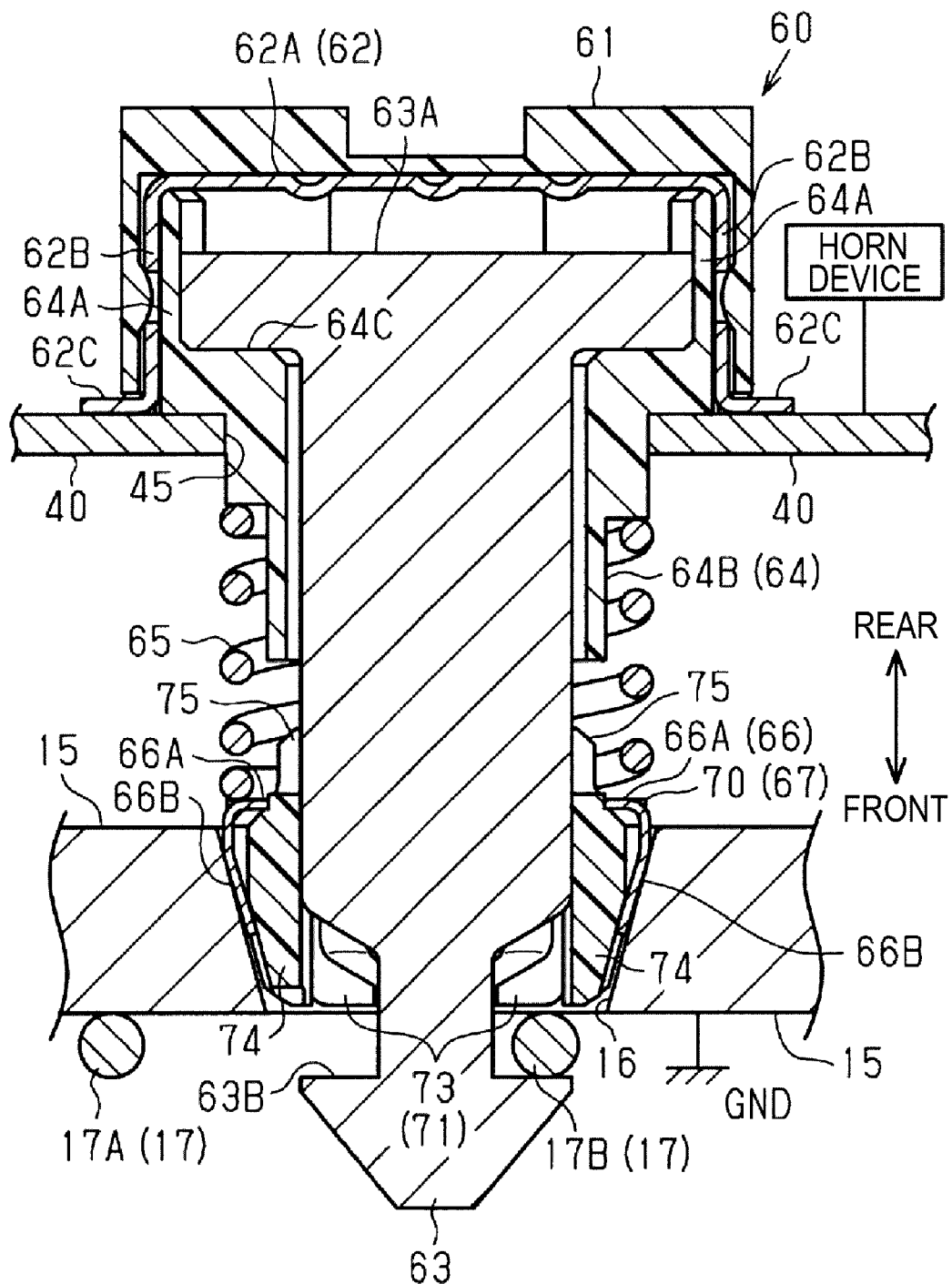
FIG. 11 is a cross-sectional view of the horn switch mechanism and arrangement of a portion in an outer contact portion in a periphery thereof.

As shown in FIG. 11, in a state where the horn switch mechanism 60 is locked to the core metal 15, the outer surfaces of the outer contact portions 66B of the connection member 66 are in contact with the inner surface of the through hole 16 of the core metal 15. In the present embodiment, the contact portions between the outer contact portions 66B and the core metal 15 form a part of the horn circuit. Further, the connection member 66 and the core metal 15 are electrically connected via the contact portions between the outer contact portions 66B and the core metal 15.

In the present embodiment, both the inner surface of the through hole 16 of the core metal 15 and the outer surfaces of the contact pieces 74 of the resin cap 67 are tapered toward the front side (lower side in FIG. 11). Further, when the horn switch mechanism 60 is attached to the wheel body 13, the outer surfaces of the contact pieces 74 of the resin cap 67 are pressed against the inner surface of the through hole 16 of the core metal 15 due to the urging force of the compression coil spring 65. Accordingly, a contact surface pressure between the inner surface of the through hole 16 of the core metal 15 and the outer surface of the contact piece 74 of the resin cap 67 is high. In the present embodiment, the outer contact portion 66B of the connection member 66 is disposed at a portion (specifically, between the outer surface of the contact piece 74 and the inner surface of the through hole 16) where the contact surface pressure is high. Therefore, the contact surface pressure between the outer contact portion 66B and the inner surface of the through hole 16 can be easily increased.

The outer contact portion 66B is shaped such that the tip end thereof is positioned to be closer to the center line C than the base end thereof, and curved so as to be convex outward (in a direction away from the center line C) from the base end to the tip end. Therefore, an intermediate portion in an extending direction of the outer contact portion 66B is pressed against the inner surface of the through hole 16 of the core metal 15. Accordingly, the intermediate portion can abuts against the inner surface of the through hole 16 in a state where the outer contact portion 66B is elastically deformed in such a manner that the intermediate portion moves to a center line C side. In this state, since the intermediate portion of the outer contact portion 66B is pressed against the inner surface of the through hole 16 by utilizing the elastic force of the outer contact portion 66B, the contact pressure between the intermediate portion of the outer contact portion 66B and the inner surface of the through hole 16 can be maintained high. Moreover, since a portion on the tip end side of the outer contact portion 66B extends obliquely in the direction toward the center line C side, the tip end of the outer contact portion 66B is prevented from abutting against the inner surface or a periphery of the through hole 16 of the core metal 15 when the horn switch mechanism 60 is inserted into the through hole 16 of the core metal 15. Accordingly, the horn switch mechanism 60 can be easily attached to the core metal 15.

Figure 12:
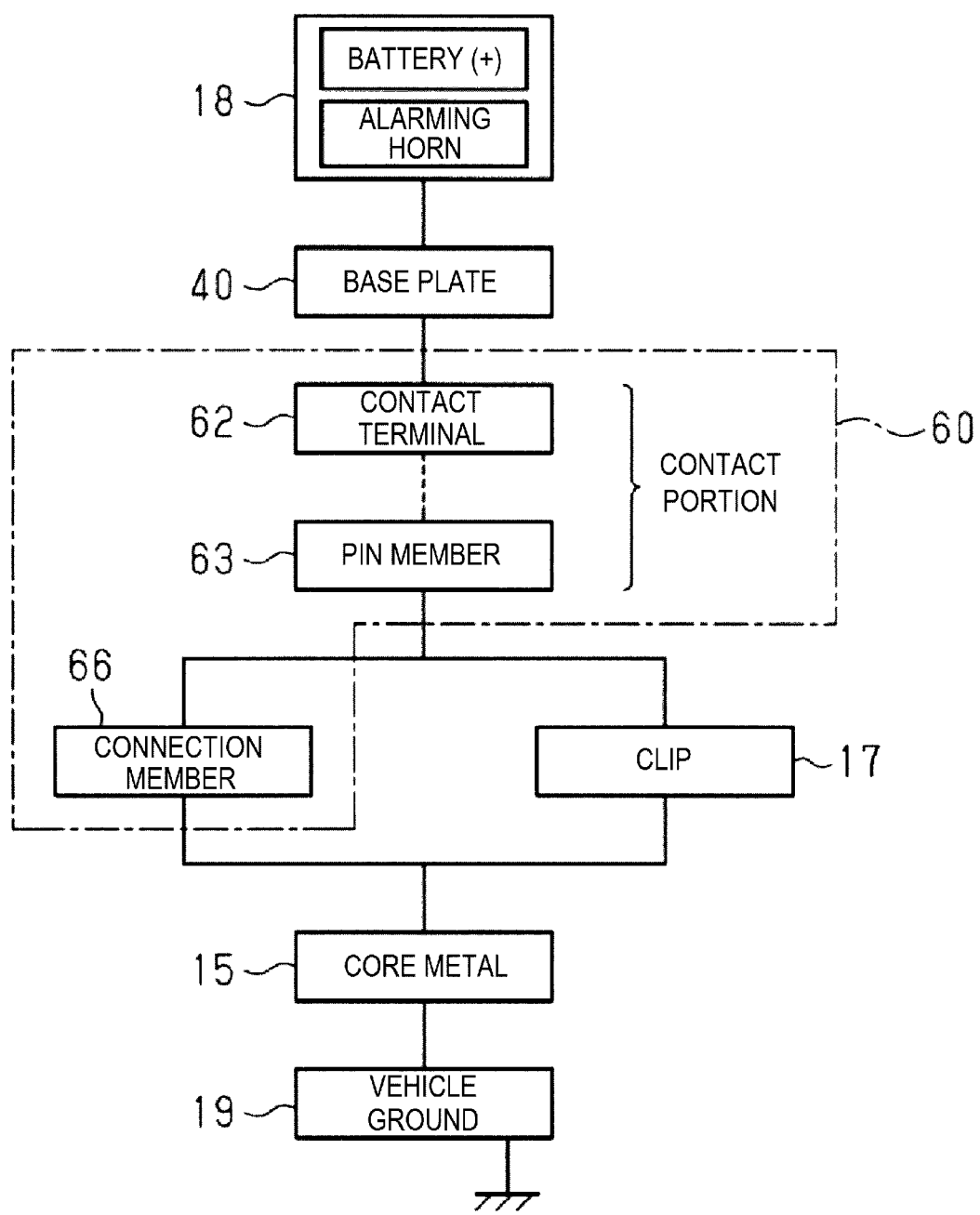
FIG. 12 is a schematic diagram showing a schematic configuration of a horn circuit.

FIG. 12 schematically shows the horn circuit. As shown in FIG. 12, in the horn circuit, the horn device 18 is connected to the base plate 40, and the contact portions (contact terminal 62, pin member 63) of the horn switch mechanism 60 is connected to the base plate 40. Meanwhile, vehicle ground 19 is connected to the core metal 15. Further, in the horn circuit of the present embodiment, a path (circuit) configured to normally connect the contact portion (specifically, the pin member 63) of the horn switch mechanism 60 and the core metal 15 is a parallel circuit formed by a first connection path constituted by the connection member 66 and a second connection path constituted by the clip 17.

Here, in the steering wheel 12 of the present embodiment, in order to attach the accessory device 14, the engagement portion 17B of the clip 17 locked to the core metal 15 is fitted to the neck portion 63B of the pin member 63 of the horn switch mechanism 60. Therefore, when the engagement portion 17B of the clip 17 is fitted to the neck portion 63B of the pin member 63, the contact surfaces of the pin member 63 and the clip 17 (specifically, the inner surface of the neck portion 63B of the pin member 63 and the outer surface of the clip 17) are rubbed, which may cause variation in contact state of the contact surface. From this point of view, if only the second connection path formed by the clip 17 is provided as the path configured to normally connect the pin member 63 and the core metal 15, the variation will be one factor that impedes the improvement of the conductivity performance between the pin member 63 and the core metal 15.

About this point, in the steering wheel 12 of the present embodiment, the first connection path formed by the connection member 66 is provided as a path configured to normally connect the pin member 63 and the core metal 15, in addition to the second connection path formed by the clip 17. Therefore, when the horn device 18 is operated, the pin member 63 and the core metal 15 can be electrically connected by each of the first connection path and the second connection path. Accordingly, since the reliability of the path connecting the pin member 63 and the core metal 15 is enhanced, the conductivity performance between the horn switch mechanism 60 and the core metal 15 can be improved.

As such a first connection path, a path not including the clip 17 is set. Therefore, a path not including a portion in which the contact state may vary, that is, an engagement portion between the neck portion 63B of the pin member 63 and the engagement portion 17B of the clip 17, can be set as a path configured to electrically connect the pin members 63 and the core metal 15. Accordingly, the conductivity performance between the horn switch mechanism 60 and the core metal 15 can be improved.

A force which causes the pin member 63 and the core metal 15 to move relative to each other in an axial direction of the pin member 63 may act on the connection portion between the pin member 63 and the core metal 15 due to vibration of the vehicle or pushing operation of the pad portion 20 by a driver, etc. Further, due to the force, a surface pressure of the contact portion (hereafter, referred to as the second contact portion) between the outer contact portion 66B of the connection member 66 forming a part of the second connection path and the inner surface of the through hole 16 of the core metal 15 may fluctuates, and a surface pressure of the contact portion (hereinafter, referred to as a first contact portion) of the clip 17 forming a part of the first connection path and the front surface of the core metal 15 may fluctuate.

In the horn switch mechanism 60 of the present embodiment, the urging force of the compression coil spring 65 acts to reduce the distance between the inner surface on the tip end side of the neck portion 63B of the pin member 63 and the tip end of the resin cap 67. Therefore, in the state where the accessory device 14 is attached to the wheel body 13 (the state shown in FIG. 11), the urging force of the compression coil spring 65 acts to press the resin cap 67 and the connection member 66 against the inner surface of the through hole 16 of the core metal 15 while pressing the clip 17 engaged with the neck portion 63B of the pin member 63 against the front surface of the core metal 15. Therefore, the steering wheel 12 in this state has a structure in which the core metal 15 is sandwiched between the clip 17 and the resin cap 67.

Therefore, when a force which pulls the pin member 63 out from the through hole 16 of the core metal 15 acts as the force, the surface pressure of the second contact portion (the outer surface of the outer contact portion 66B and the inner surface of the through hole 16) which forms a part of the second connection path is decreased, but the surface pressure of the first contact portion (the clip 17 and the front surface of the core metal 15) which forms a part of the first connection path is increased. At this time, proper conduction between the horn switch mechanism 60 and the core metal 15 is obtained via the first contact portion of the first connection path where the surface pressure is high.

Meanwhile, when a force which pushes the pin member 63 into the through hole 16 of the core metal 15 acts as the force, the surface pressure of the first contact portion which forms a part of the first connection path is decreased, but the surface pressure of the second contact portion which forms a part of the second connection path is increased. Therefore, proper conduction between the horn switch mechanism 60 and the core metal 15 is obtained via the second contact portion of the second connection path where the surface pressure is high.

Thus, in the steering wheel 12 of the present embodiment, even if a force acts to move the pin member 63 relative to the core metal 15 in the axial direction of the pin member 63, one of the surface pressure of the first contact portion which forms a part of the first connection path and the surface pressure of the second contact portion which forms a part of the second connection path is maintained high. Accordingly, since the conductivity performance of either of the first connection path and the second connection path is maintained high, the conductivity performance between the horn switch mechanism 60 and the core metal 15 can be maintained high.

As described above, the following effects can be obtained according to the present embodiment. (1) A plurality of connection paths configured to normally connect the pin member 63 and the core metal 15 are provided in a manner of forming a part of the horn circuit. Accordingly, the conductivity performance between the horn switch mechanism 60 and the core metal 15 can be improved.

(2) A path not including the clip 17 is set as one of the two connection paths (first connection path) configured to normally connect the pin member 63 and the core metal 15. Therefore, a path not including a portion in which the contact state may vary, that is, an engagement portion between the neck portion 63B of the pin member 63 and the engagement portion 17B of the clip 17, can be set as a path configured to electrically connect the pin members 63 and the core metal 15. Therefore, the conductivity performance between the horn switch mechanism 60 and the core metal 15 can be improved.

(3) The steering wheel 12 has a structure in which the core metal 15 is sandwiched between the clip 17 and the resin cap 67. Accordingly, since the conductivity performance of either of the first connection path and the second connection path can be maintained high, the conductivity performance between the horn switch mechanism 60 and the core metal 15 can be maintained high.

(4) Both the inner surface of the through hole 16 of the core metal 15 and the outer surface of the contact piece 74 of the resin cap 67 are tapered toward the front side. Accordingly, since the outer contact portion 66B of the connection member 66 can be disposed in the portion where the contact surface pressure is high, the contact surface pressure between the outer contact portion 66B and the inner surface of the through hole 16 can be easily increased.

(5) The resin cap 67 and the connection member 66 has a structure in which the outer surfaces of the pair of contact pieces 74 whose distance is narrowed toward the tip end thereof are sandwiched by the pair of outer contact portions 66B whose distance is also narrowed toward the tip end thereof. Accordingly, since the connection member 66 can be supported by the resin cap 67 in a state of not coming off easily, the horn switch mechanism 60 can be easily assembled.

(6) The outer contact portion 66B of the connection member 66 is shaped such that the tip end thereof is positioned to be closer to the center line C than the base end thereof, and is curved so as to be convex outward from the base end to the tip end. Therefore, the contact surface pressure between the intermediate portion in the extension direction of the outer contact portion 66B, and the inner surface of the through hole 16 can be maintained high. Moreover, since the tip end of the outer contact portion 66B is prevented from abutting against the inner surface or the periphery of the through hole 16 of the core metal 15 when the horn switch mechanism 60 is inserted into the through hole 16 of the core metal 15, the horn switch mechanism 60 can be easily attached to the core metal 15.

(7) The base portion 66A of the connection member 66 is sandwiched and held between the tip end of the compression coil spring 65 and the base annular portion 70 of the resin cap 67. Therefore, the connection member 66 can be firmly supported in the horn switch mechanism 60.

The above embodiment may be modified and implemented as follows.

The connection member 66 may be formed of metal material rather than copper (for example, an iron alloy) or a conductive material rather than the metal material (for example, a conductive resin).

The shape of the outer contact portion 66B of the connection member 66 can be arbitrarily changed as long as the connection member 66 contacts the inner surface of the through hole 16 of the core metal 15 with an appropriate contact pressure. The shape of the connection member 66 can be arbitrarily changed. In short, it is sufficient that the connection member 66 includes an inner contact portion which contacts the outer surface of the pin member 63, an outer contact portion which contacts the inner surface of the through hole 16, and a base portion connecting the inner contact portion and the outer contact portion into a whole. For example, the base portion 66A can be C-shaped, and the inner contact portion 66C can be curved so as to be convex inward (in a direction approaching the center line C) from the base end thereof to the tip end thereof. The inner contact portion, the outer contact portion, and the base portion may be integrally formed of a long metal plate so as to extend substantially in a U-shape. In addition, the connection member is not limited to the structure in which the base portion 66A is sandwiched between the compression coil spring 65 and the base annular portion 70 of the resin cap 67, it is also possible to adopt a structure of being fitted to the resin cap 67 from the tip end side thereof.

The inner surface shape of the through hole 16 of the core metal 15 and the outer surface shape of the contact piece 74 of the resin cap 67 adopts a tapered shape toward the tip end thereof, but it is not limited thereto, and any shape can be adopted. For example, the through holes 16 of the core metal 15 can be extended with the same cross section (circular cross section, rectangular cross section), and each contact piece 74 of the resin cap 67 can be shaped such that the outer surface thereof extends substantially parallel to the center line C.

A path rather than the first connection path constituted by the connection member 66 and the second connection path constituted by the clip 17 may be adopted as a connection path configured to normally connect the pin member 63 and the core metal 15. For example, the resin cap may be formed of conductive resin material, and the pin member 63 and the core metal 15 may be connected via the resin cap.

Three or more connection paths configured to normally connect the pin member 63 and the core metal 15 may be provided.

The steering wheel of the above embodiment can also be applied to a steering wheel in which a contact portion used to switch the horn circuit between a conductive state and a non-conduction state is provided in a portion rather than the horn switch mechanism.

What is claimed is:

1. A steering wheel, in which an airbag device is attached to a core metal, including a through hole for attachment of the airbag device and being formed of metal material, via a horn switch mechanism which is configured to operate a horn device, the horn switch mechanism including: a metal pin member whose tip end portion is locked to the core metal via an engagement member to be engaged with the tip end portion in a state where the tip end portion is inserted into the through hole and which forms a part of an electrical circuit configured to operate the horn device; and a resin cap which is interposed between an inner surface of the through hole and an outer surface of the pin member to prevent contact of the inner surface with the outer surface and which is formed of synthetic resin, the steering wheel comprising:
a plurality of connection paths configured to normally connect the pin member and the core metal in a manner of forming a part of the electrical circuit, wherein the connection paths include:
a first connection path in which a conductive engagement member is provided in a manner of being in contact with an outer surface of the core metal and the outer surface of the pin member; and
a second connection path provided with a conductive connection member including: an inner contact portion which extends along an inner surface of the resin cap and is in contact with the outer surface of the pin member, an outer contact portion which extends along an outer surface of the resin cap and is in contact with the inner surface of the through hole, and a base portion which connects the inner contact portion and the outer contact portion into a whole.

2. The steering wheel according to claim 1,
wherein the inner surface of the through hole and the outer surface of the resin cap at a portion where the inner surface and the outer surface are in contact are both tapered toward a tip end side of the pin member.

3. The steering wheel according to claim 1,
wherein the horn switch mechanism includes a compression spring which is inserted through the pin member and urges a portion of the resin cap on an airbag device side toward a core metal side, and
wherein the base portion has an annular shape and is sandwiched and held between the compression spring and the resin cap in a state where the pin member is inserted.

4. A steering wheel, in which an airbag device is attached to a core metal, including a through hole for attachment of the airbag device and being formed of metal material, via a horn switch mechanism which is configured to operate a horn device, the horn switch mechanism including: a metal pin member whose tip end portion is locked to the core metal via an engagement member to be engaged with the tip end portion in a state where the tip end portion is inserted into the through hole and which forms a part of an electrical circuit configured to operate the horn device; and a resin cap which is interposed between an inner surface of the through hole and an outer surface of the pin member to prevent contact of the inner surface and with the outer surface and which is formed of synthetic resin, the steering wheel comprising:
a conductive connection member including: an inner contact portion which extends along an inner surface of the resin cap and is in contact with the outer surface of the pin member; an outer contact portion which extends along an outer surface of the resin cap and is in contact with the inner surface of the through hole; and a base portion which connects the inner contact portion and the outer contact portion into a whole.

5. The steering wheel according to claim 4,
wherein the inner surface of the through hole and the outer surface of the resin cap at a portion where the inner surface and the outer surface are in contact are both tapered toward a tip end side of the pin member.

6. The steering wheel according to claim 4,
wherein the horn switch mechanism includes a compression spring which is inserted through the pin member and urges a portion of the resin cap on an airbag device side toward a core metal side, and
wherein the base portion has an annular shape and is sandwiched and held between the compression spring and the resin cap in a state where the pin member is inserted.

* * * * *